US009774444B2

(12) United States Patent
Cheng et al.

(10) Patent No.: US 9,774,444 B2
(45) Date of Patent: Sep. 26, 2017

(54) DECRYPTION ENGINE AND DECRYPTION METHOD

(71) Applicant: Realtek Semiconductor Corp., HsinChu (TW)

(72) Inventors: Ching-Sheng Cheng, Nantou County (TW); Kuan-Chia Huang, New Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 66 days.

(21) Appl. No.: 14/793,734

(22) Filed: Jul. 7, 2015

(65) Prior Publication Data

US 2016/0013938 A1 Jan. 14, 2016

(30) Foreign Application Priority Data

Jul. 9, 2014 (TW) .............................. 103123680 A

(51) Int. Cl.
*H04L 9/08* (2006.01)
*H04L 9/06* (2006.01)
*H04L 9/12* (2006.01)

(52) U.S. Cl.
CPC .......... *H04L 9/0637* (2013.01); *H04L 9/0891* (2013.01); *H04L 9/12* (2013.01)

(58) Field of Classification Search
CPC ........ H04L 9/12; H04L 9/0637; H04L 9/0891
See application file for complete search history.

(56) References Cited

U.S. PATENT DOCUMENTS

| 7,131,004 | B1* | 10/2006 | Lyle | .......................... | H04L 9/12 |
| | | | | | 348/E7.056 |
| 7,242,766 | B1* | 7/2007 | Lyle | .......................... | H04L 9/12 |
| | | | | | 380/2 |
| 8,792,643 | B1* | 7/2014 | Galligan | ............... | H04L 9/0637 |
| | | | | | 380/262 |
| 9,270,456 | B1* | 2/2016 | Galligan | ............... | H04L 9/0637 |
| 2002/0164029 | A1* | 11/2002 | Jiang | ......................... | H04L 9/12 |
| | | | | | 380/270 |

(Continued)

OTHER PUBLICATIONS

"High-bandwidth Digital Content Protection System: Mapping HDCP to HDMI Revision 2.2" Feb. 13, 2013 (72 pages) https://www.digital-cp.com/sites/default/files/specifications/HDCP%20on%20HDMI%20Specification%20Rev2_2_Final1.pdf.*

*Primary Examiner* — Joseph P Hirl
*Assistant Examiner* — Thomas Gyorfi
(74) *Attorney, Agent, or Firm* — Winston Hsu

(57) ABSTRACT

A decryption engine includes an update circuit, a key generator, a decryption circuit and a detection circuit. The update circuit generates a first updating information based on a premise of that a currently received frame is encrypted, and generates a second updating information based on a premise of that the currently received frame is non-encrypted. The key generator produces a first key according to the first updating information, and produces a second key according to the second updating information. The decryption circuit generates a first decrypted frame according to the first key and the currently received frame, and generates a second decrypted frame according to the second key and the currently received frame. The detection circuit detects whether the currently received frame is decrypted according to the first decrypted frame and the second decrypted frame, to generate an encryption detection result.

14 Claims, 3 Drawing Sheets

(56) References Cited

U.S. PATENT DOCUMENTS

| | | | | |
|---|---|---|---|---|
| 2004/0081333 A1* | 4/2004 | Grab | ............... | H04K 1/00 |
| | | | | 382/100 |
| 2005/0058293 A1* | 3/2005 | Higurashi | ............... | H04L 9/12 |
| | | | | 380/274 |
| 2005/0213759 A1* | 9/2005 | Tsuchida | ............... | H04N 7/163 |
| | | | | 380/210 |
| 2010/0014669 A1* | 1/2010 | Jiang | ............... | H04L 9/0637 |
| | | | | 380/255 |
| 2010/0020976 A1* | 1/2010 | Ma | ............... | H04H 60/23 |
| | | | | 380/278 |
| 2015/0296253 A1* | 10/2015 | Adikari | ............... | H04N 21/4408 |
| | | | | 725/31 |

* cited by examiner

DECRYPTION ENGINE AND DECRYPTION METHOD

BACKGROUND OF THE INVENTION

1. Field of the Invention

The disclosed embodiments of the present invention relate to encryption/decryption, and more particularly, to a decryption engine and a decryption method.

2. Description of the Prior Art

In the encryption/decryption system such as High-Bandwidth Digital Content Protection (HDCP) 2.2, there are two steps in the decryption process of the receiving terminal. The first step is to complete an authentication flow with the transmitting terminal. The second step is to activate an Advanced Encryption Standard Counter (AES-CTR) engine to calculate a key, so as to use the key to perform the decryption process. However, if the transmitting terminal sends a wrong control signal during the decryption process, it will cause a synchronization failure. Once the synchronization failure occurs, the user can not see the normal image, and the user has to wait until the receiving terminal normally discovers and recognizes the synchronization failure, and the receiving terminal will send a re-authentication request to the transmitting terminal and recover from the error status via a long authentication process. It is very bad for the user experience, and thus an innovative method is required to solve the above-mentioned problem.

SUMMARY OF THE INVENTION

It is therefore one of the objectives of the present invention to provide a decryption engine and a decryption method, so as to solve the above-mentioned problem.

In accordance with a first embodiment of the present invention, an exemplary decryption engine is disclosed. The decryption engine comprises: an update circuit, a key generator, a decryption circuit and a detection circuit. The update circuit generates a first updating information based on a premise of that a currently received frame is encrypted, and generates a second updating information based on a premise of that the currently received frame is non-encrypted. The key generator produces a first key according to the first updating information, and produces a second key according to the second updating information. The decryption circuit generates a first decrypted frame according to the first key and the currently received frame, and generates a second decrypted frame according to the second key and the currently received frame. The detection circuit detects whether the currently received frame is decrypted according to the first decrypted frame and the second decrypted frame, to generate an encryption detection result.

In accordance with a first embodiment of the present invention, an exemplary decryption method is disclosed. The decryption method comprises: generating a first updating information based on a premise of that a currently received frame is encrypted, and generating a second updating information based on a premise of that the currently received frame is non-encrypted; producing a first key according to the first updating information, and producing a second key according to the second updating information; generating a first decrypted frame according to the first key and the currently received frame, and generating a second decrypted frame according to the second key and the currently received frame; and detecting whether the currently received frame is decrypted at least according to the first decrypted frame and the second decrypted frame, to generate an encryption detection result.

The spirit of the present invention is not using the control signal from the transmitting terminal to determine the current frame encrypted/non-encrypted, but generates an encrypted key and a non-encrypted key simultaneously and respectively uses the encrypted key and the non-encrypted key to decrypt the input frame, so as to generate two frames according to different keys, and then use the image process method to determine which one is the correct image for the user and which one is the noise, so as to reversely determine the current frame encrypted/non-encrypted, and update to generate next encrypted key and next non-encrypted key accordingly. In this way, it will not be affected by errors of the control signal from the transmitting terminal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
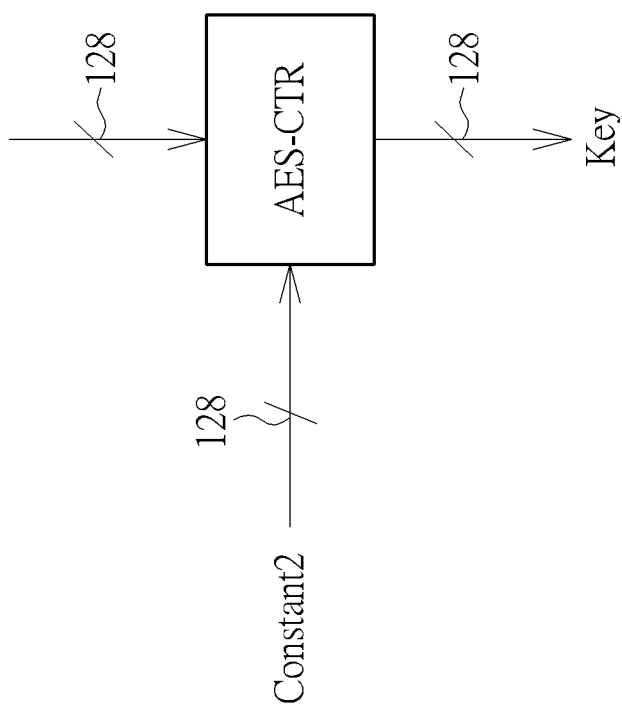
FIG. 1 is a block diagram illustrating a conventional Advanced Encryption Standard Counter (AES-CTR).

It is therefore one of the objectives of the present invention to provide a decryption engine and a decryption method, so as to solve the above-mentioned problem. FIG. 1 is a block diagram illustrating a conventional Advanced Encryption Standard Counter (AES-CTR). In general, after the receiving terminal and the transmitting terminal are authenticated, a first constant Constant1 and a second constant Constant2 are obtained, and they are two constant values. After starting to transmit the data (such as the frames or the packets), the AES-CTR will calculate a key Key according to the first constant Constant1, the second constant Constant2, a frame number FrameNumber, and a data number DataNumber, wherein the frame number FrameNumber represents the decrypted frame number and the data number DataNumber represents the generated key number. Under the normal condition, the transmitting terminal will transmit a corresponding control signal while transmitting each frame, and the receiving terminal will perform a corresponding update accordingly for the frame number FrameNumber and the data number DataNumber. However, once the control signal has errors, the update of the frame number FrameNumber and the data number DataNumber will have errors, and the AES-CTR in FIG. 1 will calculate a wrong key Key.

The spirit of the present invention is not using the control signal from the transmitting terminal to determine the current frame encrypted/non-encrypted, but generates an encrypted key and a non-encrypted key simultaneously and respectively uses the encrypted key and the non-encrypted key to decrypt the input frame, so as to generate two frames according to different keys, and then use the image process method to determine which one is the correct image for the user and which one is the noise, so as to reversely determine the current frame encrypted/non-encrypted, and update to generate next encrypted key and next non-encrypted key accordingly. In this way, it will not be affected by errors of the control signal from the transmitting terminal.

Figure 2:
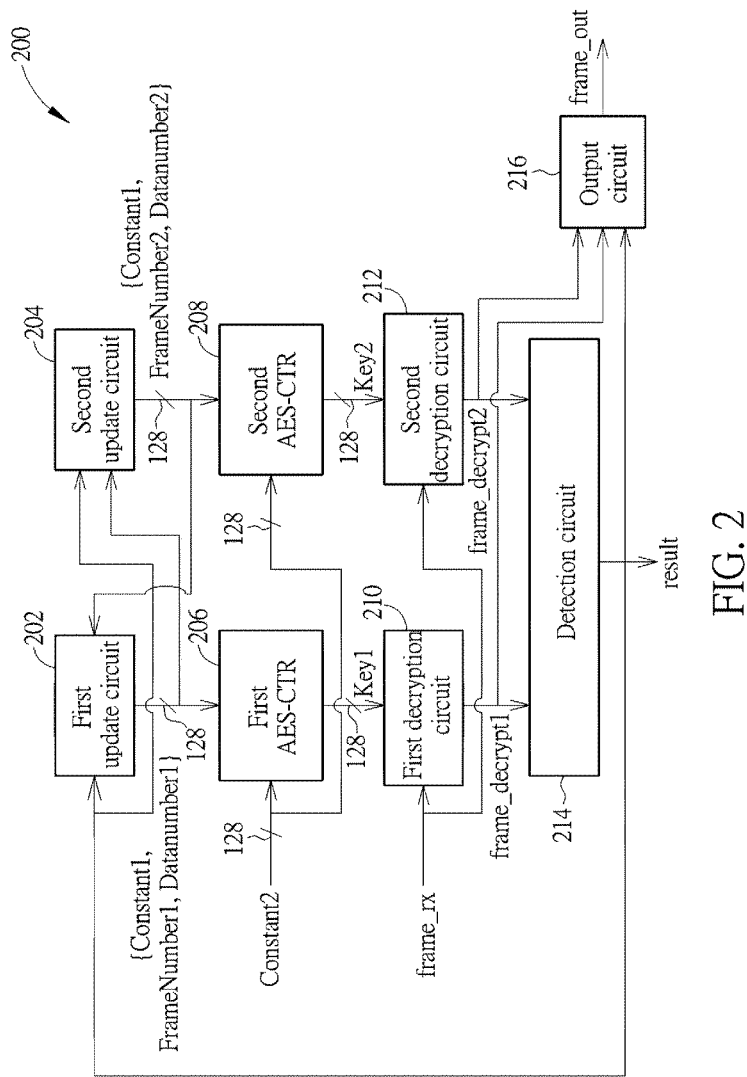
FIG. 2 is a block diagram illustrating a decryption engine according to an embodiment of the present invention.

Please refer to FIG. 2. FIG. 2 is a block diagram illustrating a decryption engine according to an embodiment of the present invention, wherein the decryption engine is an advanced encryption standard engine 200 which fits spec of High-Bandwidth Digital Content Protection (HDCP) 2.2. The advanced encryption standard engine 200 comprises: a first update circuit 202, a second update circuit 204, a first AES-CTR 206, a second AES-CTR 208, a first decryption circuit 210, a second decryption circuit 212, a detection circuit 214, and an output circuit 216. Please note that the present invention is not limited to the spec of HDCP 2.2, but can be applied to other encryption/decryption systems. For example, the advanced encryption standard engine 200 can be other types of standard decryption engines, and the first AES-CTR 206 and the second AES-CTR 208 also can be key generators fitting other standards. The advanced encryption standard engine 200 is implemented in a receiving terminal, such as in a HDCP 2.2 standard receiving terminal, and utilized for performing a decryption process for the data transmitted from a transmitting terminal. After the receiving terminal and the transmitting terminal are authenticated, a first constant Constant1 and a second constant Constant2 are obtained (128 bits in this embodiment), and they are two constant values. After starting to transmit the data (such as the frames comprising the image data and/or the packets comprising the control data), the advanced encryption standard engine 200 will calculate a first key number Key1 and a second key number Key2 according to the first constant Constant1, the second constant Constant2, a first frame number FrameNumber1, a second frame number FrameNumber2, a first data number DataNumber1, and a second data number DataNumber2, so as to correctly decrypt the frames in the received data. For the first update circuit 202, the first frame number FrameNumber1 is a frame number of that from firstly authenticated to currently decrypted. For the second update circuit 204, the second frame number FrameNumber2 is a frame number of that from firstly authenticated to currently decrypted. For the first update circuit 202, the first key number Key1 is a key number of that from firstly authenticated to currently decrypted. For the second update circuit 204, the second key number Key2 is a key number of that from firstly authenticated to currently decrypted.

Specifically, the first update circuit 202 continuously views a current (time T) input frame frame_rx as the encrypted frame, and generates the first frame number FrameNumber1 and the first data number DataNumber1 accordingly. That is, the first frame number FrameNumber1 and the first data number DataNumber1 are accumulated continuously, and the first constant Constant1, the first frame number FrameNumber1, and the first data number DataNumber1 (128 bits in this embodiment) are transmitted to the first AES-CTR 206. On the contrary, the second update circuit 204 continuously views the input frame frame_rx as the non-encrypted frame, and generates the second frame number FrameNumber2 and the second data number DataNumber2 accordingly. That is, the second frame number FrameNumber2 and the second data number DataNumber2 are not accumulated continuously, and the second constant Constant2, the second frame number FrameNumber2, and the second data number DataNumber2 (128 bits in this embodiment) are transmitted to the second AES-CTR 208.

The first AES-CTR 206 generates the first key number Key1 according to the second constant Constant2 (128 bits in this embodiment), the first constant Constant1, the first frame number FrameNumber1, and the first data number DataNumber1, to the first decryption circuit 210. The second AES-CTR 208 generates the second key number Key2 according to the second constant Constant2 (128 bits in this embodiment), the first constant Constant1, the second frame number FrameNumber2, and the second data number DataNumber2, to the second decryption circuit 212.

The first decryption circuit 210 decrypts the input frame frame_rx according to the first key number Key1, and outputs a first decrypted frame frame_decrypt1. The second decryption circuit 212 decrypts the input frame frame_rx according to the second key number Key2, and outputs a second decrypted frame frame_decrypt2. The detection circuit 214 performs the image process for the first decrypted frame frame_decrypt1 and the second decrypted frame frame_decrypt2, respectively. There is no doubt that one of the first decrypted frame frame_decrypt1 and the second decrypted frame frame_decrypt2 will be a correctly decrypted image, and another one will be a meaningless noise. Thus, the key of the detection circuit 214 is using the image process technology to authenticate which one of the first decrypted frame frame_decrypt1 and the second decrypted frame frame_decrypt2 is the correctly decrypted image.

For example, it is practical to respectively convert the first decrypted frame frame_decrypt1 and the second decrypted frame frame_decrypt2 to gray level, and then perform a smooth process for them (such as adding the adjacent pixels and calculating a mean value). Next, compare the pixel value of each pixel in the two frames after smooth processed with a first threshold value (such as 127), if there is no pixel value greater than the first threshold value, then determine it as the noise frame; otherwise, determine it as the correctly decrypted image. Or for example, it is practical to respectively convert the first decrypted frame frame_decrypt1 and the second decrypted frame frame_decrypt2 to gray level and perform the Fourier transform, and then compare the pixel value of each pixel in the two frames after the Fourier transform with a second threshold value. For the noise frame, except the center points, the pixel value of other pixels should be smaller than the second threshold, and for the correctly decrypted image frame, there is a different characteristic. The image process technologies are all well known to those of average skill in this art, and thus further explanation of the details and operations are omitted herein for the sake of brevity.

After the detection circuit 214 determines which one of the first decrypted frame frame_decrypt1 and the second decrypted frame frame_decrypt2 is the correctly decrypted image, an determined result result of whether the input frame frame_rx for time T is the encrypted frame is transmitted to the output circuit 216, the first update circuit 202, and the second update circuit 204. In this way, the output circuit 216 can select to output the first decrypted frame frame_decrypt1 or the second decrypted frame frame_decrypt2 as an output frame frame_out according to the determined result. In addition, the first update circuit 202 and the second update circuit 204 will correct the update for the input frame frame_rx at time T according to the determined result. For example, if the determined result indicates that the input frame frame_rx is the encrypted frame, then the update for the input frame frame_rx at time T by the first update circuit 202 is correct and does not require to be corrected, and the update for the input frame frame_rx at time T by the second update circuit 204 is wrong and requires to be corrected before the input frame frame_rx comes at time T+1. Otherwise, if the determined result indicates that the input frame frame_rx is the non-encrypted frame, then the update for the input frame frame_rx at time T by the first update circuit 202 is wrong and requires to be corrected before the input frame frame_rx comes at time T+1, and the update for the input frame frame_rx at time T by the second update circuit 204 is correct and does not require to be corrected. Next, the advanced encryption standard engine 200 will repeat the same steps to update and detect.

Figure 3:
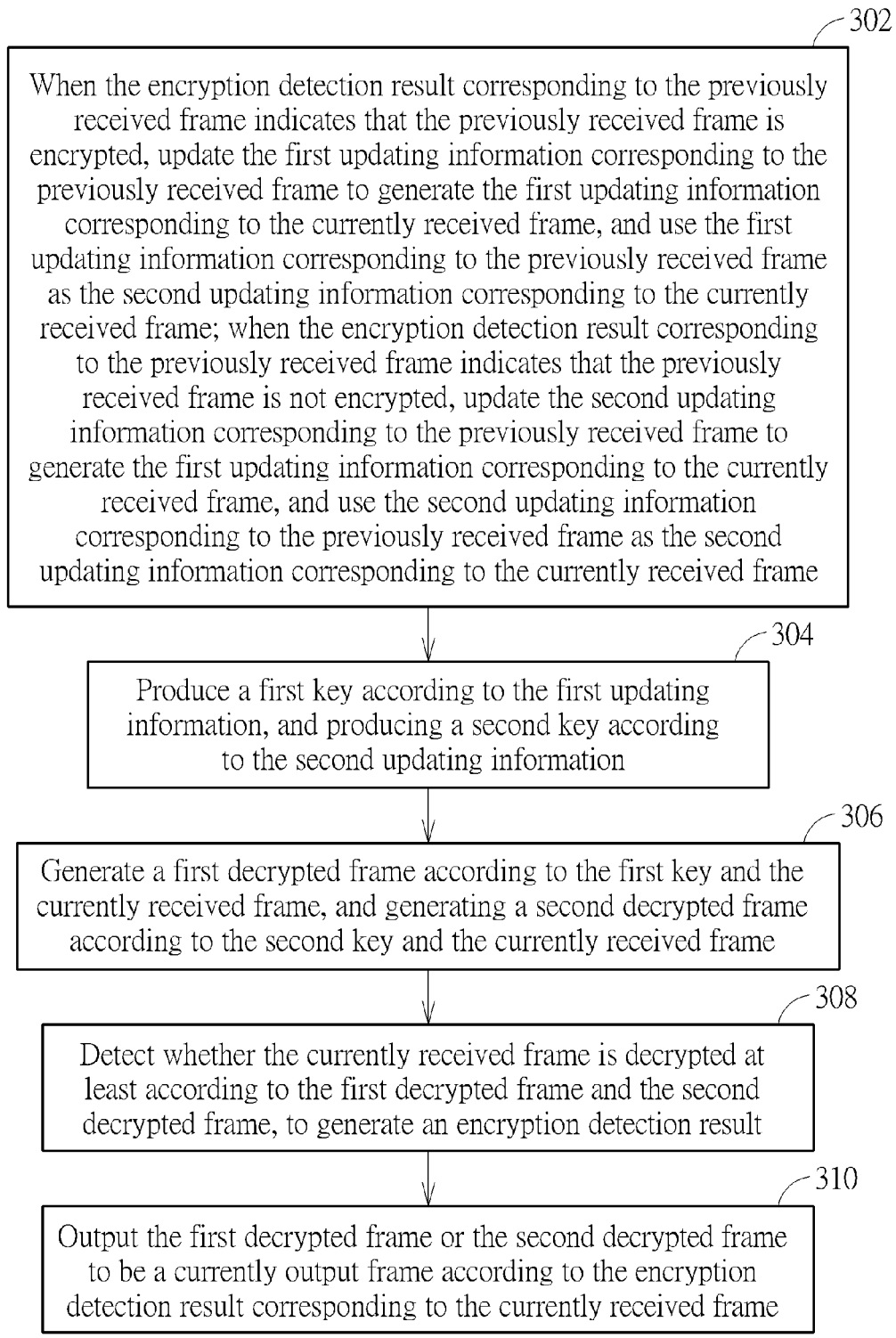
FIG. 3 is a flowchart showing a decryption method in accordance with an exemplary embodiment of the present invention.

Please refer to FIG. 3. FIG. 3 is a flowchart showing a decryption method in accordance with an exemplary embodiment of the present invention, wherein the decryption method fits spec of High-Bandwidth Digital Content Protection (HDCP) 2.2 as the decryption engine 200 does in the above embodiment. Provided that the result is substantially the same, the steps in FIG. 3 are not required to be executed in the exact order of flowchart shown in FIG. 3. Moreover, some steps in FIG. 3 can be omitted according to different embodiments or design requirements. The decryption method disclosed by the present invention comprises the following steps:

Step 302: When the encryption detection result corresponding to the previously received frame indicates that the previously received frame is encrypted, update the first updating information corresponding to the previously received frame to generate the first updating information corresponding to the currently received frame, and use the first updating information corresponding to the previously received frame as the second updating information corresponding to the currently received frame; when the encryption detection result corresponding to the previously received frame indicates that the previously received frame is not encrypted, update the second updating information corresponding to the previously received frame to generate the first updating information corresponding to the currently received frame, and use the second updating information corresponding to the previously received frame as the second updating information corresponding to the currently received frame.

Step 304: Produce a first key according to the first updating information, and producing a second key according to the second updating information.

Step 306: Generate a first decrypted frame according to the first key and the currently received frame, and generating a second decrypted frame according to the second key and the currently received frame.

Step 308: Detect whether the currently received frame is decrypted at least according to the first decrypted frame and the second decrypted frame, to generate an encryption detection result.

Step 310: Output the first decrypted frame or the second decrypted frame to be a currently output frame according to the encryption detection result corresponding to the currently received frame.

The steps of the decryption method should be clearly understood by those of average skill in this art after reading the operational details and configuration details of the decryption engine 200 does in the above embodiment, and thus further explanation of the details and operations for the steps of the decryption method are omitted herein for the sake of brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A decryption engine, comprising:
   an update circuit, for generating a first updating information corresponding to a currently received frame by regarding the currently received frame as an encrypted frame, and generating a second updating information corresponding to the currently received frame by regarding the currently received frame as a non-encrypted frame, wherein the update circuit generates both the first updating information and the second updating information at a time;
   a key generator, for producing a first key according to the first updating information, and producing a second key according to the second updating information;
   a decryption circuit, for generating a first decrypted frame according to the first key and the currently received frame, and generating a second decrypted frame according to the second key and the currently received frame; and
   a detection circuit, for detecting whether the currently received frame is encrypted at least according to the first decrypted frame and the second decrypted frame, to generate an encryption detection result.

2. The decryption engine of claim 1, further comprising:
   an output circuit, for outputting the first decrypted frame or the second decrypted frame to be a currently output frame according to the encryption detection result corresponding to the currently received frame.

3. The decryption engine of claim 1, wherein the decryption engine processes a previously received frame and the currently received frame in sequence; the update circuit generates the first updating information by regarding the currently received frame as the encrypted frame at least according to an encryption detection result corresponding to the previously received frame, and generates the second updating information by regarding the currently received frame as the non-encrypted frame at least according to the encryption detection result corresponding to the previously received frame.

4. The decryption engine of claim 3, wherein when the encryption detection result corresponding to the previously received frame indicates that the previously received frame is encrypted, the update circuit generates the first updating information corresponding to the currently received frame according to a first updating information corresponding to the previously received frame, and generates the second updating information corresponding to the currently received frame according to the first updating information corresponding to the previously received frame; when the encryption detection result corresponding to the previously received frame indicates that the previously received frame is not encrypted, the update circuit generates the first updating information corresponding to the currently received frame according to a second updating information corresponding to the previously received frame, and generates the second updating information corresponding to the currently received frame according to the second updating information corresponding to the previously received frame; the update circuit generates the first updating information corresponding to the previously received frame by regarding the previously received frame as encrypted; and the update circuit generates the second updating information corresponding to the previously received frame by regarding the previously received frame as non-encrypted.

5. The decryption engine of claim 4, wherein when the encryption detection result corresponding to the previously received frame indicates that the previously received frame is encrypted, the update circuit updates the first updating information corresponding to the previously received frame to generate the first updating information corresponding to the currently received frame, and uses the first updating information corresponding to the previously received frame as the second updating information corresponding to the currently received frame; when the encryption detection result corresponding to the previously received frame indicates that the previously received frame is not encrypted, the update circuit updates the second updating information corresponding to the previously received frame to generate the first updating information corresponding to the currently received frame, and uses the second updating information corresponding to the previously received frame as the second updating information corresponding to the currently received frame.

6. The decryption engine of claim 1, wherein the first updating information and the second updating information respectively comprise a decrypted frame number or a generated key number.

7. The decryption engine of claim 1, wherein the decryption engine fits spec of High-Bandwidth Digital Content Protection (HDCP) 2.2, and the key generator is an Advanced Encryption Standard Counter (AES-CTR).

8. A decryption method, comprising:
generating a first updating information corresponding to a currently received frame by regarding the currently received frame as an encrypted frame, and generating a second updating information corresponding to the currently received frame by regarding the currently received frame as a non-encrypted frame, wherein the update circuit generates both the first updating information and the second updating information at a time;
producing a first key according to the first updating information, and producing a second key according to the second updating information;
generating a first decrypted frame according to the first key and the currently received frame, and generating a second decrypted frame according to the second key and the currently received frame; and
detecting whether the currently received frame is encrypted at least according to the first decrypted frame and the second decrypted frame, to generate an encryption detection result.

9. The decryption method of claim 8, further comprising:
outputting the first decrypted frame or the second decrypted frame to be a currently output frame according to the encryption detection result corresponding to the currently received frame.

10. The decryption method of claim 8, wherein the decryption method processes a previously received frame and the currently received frame in sequence; the step of generating the first updating information by regarding the currently received frame as the encrypted frame, and generating the second updating information by regarding the currently received frame as a non-encrypted frame comprises:
generating the first updating information by regarding the currently received frame as the encrypted frame at least according to an encryption detection result corresponding to the previously received frame, and generating the second updating information by regarding the currently received frame as the non-encrypted frame at least according to the encryption detection result corresponding to the previously received frame.

11. The decryption method of claim 10, wherein in the step of generating the first updating information by regarding the currently received frame as the encrypted frame at least according to the encryption detection result corresponding to the previously received frame, and generating the second updating information by regarding the currently received frame as the non-encrypted frame at least according to the encryption detection result corresponding to the previously received frame comprises:
when the encryption detection result corresponding to the previously received frame indicates that the previously received frame is encrypted, generating the first updating information corresponding to the currently received frame according to a first updating information corresponding to the previously received frame, and generating the second updating information corresponding to the currently received frame according to the first updating information corresponding to the previously received frame; and
when the encryption detection result corresponding to the previously received frame indicates that the previously received frame is not encrypted, generating the first updating information corresponding to the currently received frame according to a second updating information corresponding to the previously received frame, and generating the second updating information corresponding to the currently received frame according to the second updating information corresponding to the previously received frame;
wherein the first updating information corresponding to the previously received frame is generated by regarding the previously received frame as encrypted; and the second updating information corresponding to the previously received frame is generated by regarding the previously received frame as non-encrypted.

12. The decryption method of claim 11, wherein when the encryption detection result corresponding to the previously received frame indicates that the previously received frame is encrypted, the step of generating the first updating information corresponding to the currently received frame and generating the second updating information corresponding to the currently received frame according to the first updating information corresponding to the previously received frame comprises:
updating the first updating information corresponding to the previously received frame to generate the first updating information corresponding to the currently received frame, and using the first updating information corresponding to the previously received frame as the second updating information corresponding to the currently received frame;
wherein when the encryption detection result corresponding to the previously received frame indicates that the previously received frame is not encrypted, the step of generating the first updating information corresponding to the currently received frame and generating the second updating information corresponding to the currently received frame according to the second updating information corresponding to the previously received frame comprises:
updating the second updating information corresponding to the previously received frame to generate the first updating information corresponding to the currently received frame, and using the second updating information corresponding to the previously received frame as the second updating information corresponding to the currently received frame.

13. The decryption method of claim 8, wherein the first updating information and the second updating information respectively comprise a decrypted frame number or a generated key number.

14. The decryption method of claim 8, wherein the decryption method fits spec of High-Bandwidth Digital Content Protection (HDCP) 2.2, and producing the first key corresponding to the currently received frame according to the first updating information and producing the second key corresponding to the currently received frame at least according to the second updating information fits a method of an Advanced Encryption Standard Counter (AES-CTR).

* * * * *